J. McKINNON.
CLOTHES DRIER.
No. 11,310. Reissued Feb. 28, 1893.
Fig. 1.
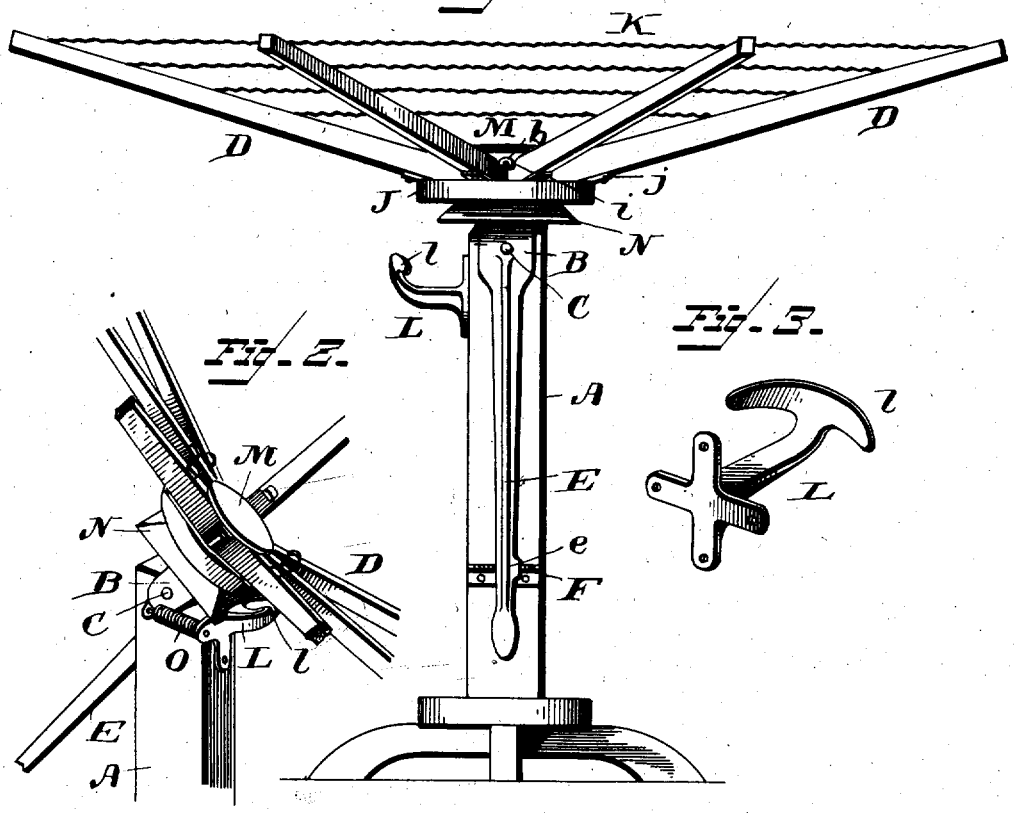
Fig. 2.
Fig. 3.
Fig. 4.
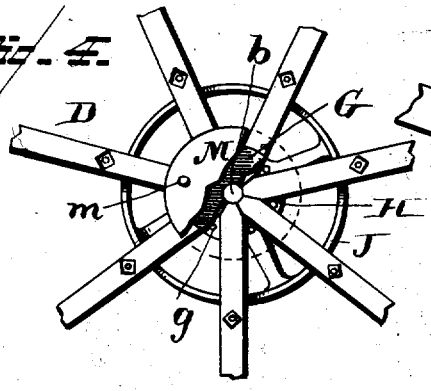
Fig. 5.
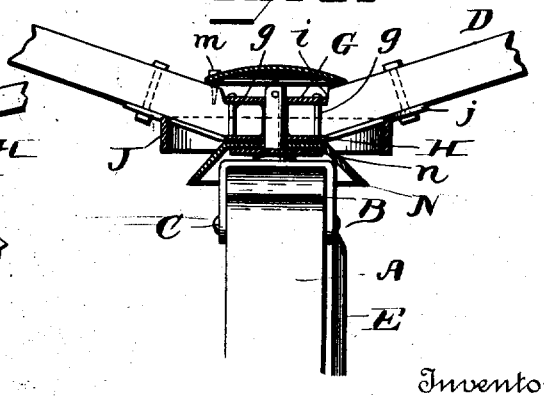
Witnesses
Albert Scidew
Lillie M. Hillyard
Inventor
John McKinnon
By Attorneys R.S. & A.P. Lacey

UNITED STATES PATENT OFFICE.

JOHN McKINNON, OF COLFAX, WASHINGTON.

CLOTHES-DRIER.

SPECIFICATION forming part of Reissued Letters Patent No. 11,310, dated February 28, 1893.

Original No. 477,439, dated June 21, 1892. Application for reissue filed January 18, 1893. Serial No. 459,306.

*To all whom it may concern:*

Be it known that I, JOHN McKINNON, a citizen of the United States, residing at Colfax, in the county of Whitman and State of Washington, have invented certain new and useful Improvements in Clothes-Driers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to clothes-line reels of that class in which the reel is constructed to tilt on the standard or support to bring a section or portion thereof within convenient reach.

The purpose of the invention is to provide a rest for sustaining the reel in its tilted position and which will at the same time form a brake to prevent the reel turning when a preponderance of weight is on one side.

A further purpose of the invention is to improve the general construction of the device, whereby its usefulness and efficiency is increased in an eminent degree.

The improvement consists of the novel features and the peculiar construction and combination of the parts, which will be hereinafter more fully described and claimed and which are shown in the annexed drawings, in which;

Figure 1 is a side view of a clothes line reel embodying my invention. Fig. 2 is a detail perspective view of the reverse side of the upper end of the post, showing the counterbalancing spring, the reel being tilted and supported in the rest and the reel-arms being broken off. Fig. 3 is a perspective view of the combined reel rest and brake. Figs. 4 and 5 are a top plan view and cross section, respectively, of the reel hub.

The post or support A is implanted in the ground or provided with a suitable base, and at its upper end has an approximately ⊓-iron B, which straddles the end of the post and is pivotally connected therewith by the bolt C, which passes through the post and the ends of the iron which embrace the sides of the said post. The journal *b*, extended vertically from the ⊓-iron B, forms a spindle for the reel D to turn on. The operating-lever E, preferably constructed of T-iron, is secured at its upper end to the ⊓-iron to tilt the same on the bolt C, and is provided near its lower end with the lip *e*, which is adapted to engage with the ratchet F to hold the reel in the proper position. In the preferable form of construction the reel tilts in one direction only, one corner of the post being rounded off to permit the tilt of the ⊓-iron without any interference.

The hub is composed of the parallel disks G and H, which are connected by the vertical stay-bars *g*, between which and the said disks the inner ends of the reel arms obtain a purchase, and the outer ring or band J, which is connected with the disk H and which forms a support for the reel arms a short distance from the inner ends of the said arms and which is provided with outward extensions *j*, to which the said arms I are bolted, as shown. The inner ends of the reel arms are reduced to form a shoulder *i*, which obtains a purchase on the edge of the disk G and limits the inward movement of the said arms. The line-wire K is crimped to prevent the clothes slipping when hung thereon and is secured to the reel arms in the usual manner.

The bracket L, secured to the post or support A, has the rest *l* at its outer end, which also forms the brake hereinbefore mentioned. This rest extends laterally and curves to conform with the circumference of the ring or band J, so as to touch the same at all points, thereby obtaining the maximum amount of frictional surface.

The deflector M, located directly over the center of the hub and journal and held in place by the pins *m*, which pass through suitable openings in the said deflector, sheds water and snow and prevents the entrance and lodgment of other foreign substances between the hub and the journal and between the hub and the hub support.

The cap N protects the ⊓-iron and the upper end of the post and is held in place by the journal *b*, which extends centrally through the same. The washer *n* between the cap N and the hub, relieves friction between the hub and cap and enables the reel to be rotated easily on the said journal *b*.

When it is desired to tilt the reel, the lever, which is elastic, is sprung to disengage it from the ratchet plate F, and the lower end of the said lever is elevated until the ring or band J obtains a purchase on the rest *l*. The friction between the rest *l* and the band or ring J is sufficient to hold the reel against rotation when a superior weight is on one side. After the clothes are placed on the reel the latter is brought to the horizontal by the lever E and held in place by engaging the said lever with the said ratchet plate F.

The spring O counterbalances or facilitates the operation of tilting the reel.

Having thus described my invention, what I claim, and desire to secure by Letters Patent, is—

1. The combination, with the tilting and rotatable reel, of a ring or band secured to and projected vertically downward from and at right angles to the plane of the said reel, and a combined rest and brake secured to the reel support and having its outer portion extended laterally and conformed to the circumference of the said band, substantially as and for the purpose described.

2. The combination, with a tilting and rotatable reel and a combined rest and brake, of a counterbalancing spring, substantially as and for the purpose described.

3. In a clothes line reel, the combination, with a post, a ⊓-iron set astraddle the end of the post and pivotally connected therewith and having a journal projected vertically thereffom, a lever connected with the said ⊓-iron, and a ratchet plate to engage with the said lever, of a cap and washer on the said journal, the reel adapted to rotate on the said journal, and a deflector held at the center of the reel, substantially in the manner shown, for the purpose described.

In testimony whereof I affix my signature in presence of two witnesses.

JOHN McKINNON.

Witnesses:
C. W. VEDDER,
JAY LAWYER.